United States Patent [19]
Mori

[11] Patent Number: 5,363,028
[45] Date of Patent: Nov. 8, 1994

[54] CIRCUIT AND METHOD OF DRIVING A DC MOTOR

[75] Inventor: Yoichi Mori, Shiga, Japan

[73] Assignee: Nippon Densan Corporation, Kyoto, Japan

[21] Appl. No.: 891,941

[22] Filed: Jun. 1, 1992

[30] Foreign Application Priority Data

May 7, 1991 [JP] Japan .................. 3-136594

[51] Int. Cl.$^5$ ................ H02K 25/00; H02K 29/00
[52] U.S. Cl. ...................... 318/599; 318/254; 318/603
[58] Field of Search ............... 318/138, 254, 439, 599, 318/600-632, 800-820, 430-437; 388/800-918

[56] References Cited

U.S. PATENT DOCUMENTS

| | | | |
|---|---|---|---|
| 4,603,283 | 7/1986 | Oltendorf | 318/254 |
| 4,631,459 | 12/1986 | Fujioka et al. | 318/254 |
| 4,641,066 | 2/1987 | Nagata et al. | 318/254 |
| 4,642,543 | 2/1987 | MacMinn | 318/696 |
| 4,700,116 | 10/1987 | Inoue et al. | 318/254 |
| 4,717,864 | 1/1988 | Fultz | 318/254 |
| 4,835,448 | 5/1989 | Dishner et al. | 318/254 |
| 4,879,498 | 11/1989 | Shinohara et al. | 318/254 |
| 4,928,043 | 5/1990 | Plunkett | 318/254 |
| 5,028,852 | 7/1991 | Dunfield | 318/254 |
| 5,177,416 | 1/1993 | Inaji et al. | 318/254 |

Primary Examiner—Paul Ip

[57] ABSTRACT

A circuit and a method of driving a DC motor is provided in which a DC power to be supplied to the DC motor is oscillated in phase for producing a variable torque. As the torque is varied, its peak value increases while its average remains unchanged. Hence, the maximum torque needed for starting rotation will successfully be obtained. Once the rotation starts, a lower torque is accepted for continuous rotation of a load. The rotation can thus be conducted by a lower amplitude of the variable torque. Accordingly, when the rotating torque of the motor becomes low due to increase in unwanted load or declination in capability, the motor can remain operable without troublesome repair or replacement.

12 Claims, 3 Drawing Sheets

CIRCUIT AND METHOD OF DRIVING A DC MOTOR

FIELD OF THE INVENTION

The present invention relates to a circuit and a method of driving a DC motor.

DESCRIPTION OF THE PRIOR ART

A common DC motor comprises a rotor having a permanent magnet and a stator having stator coils of e.g. three phase type. In particular, a brushless DC motor is provided in which the rotation of a rotor is activated and controlled by a rotating torque generated upon supplying currents to the stator coils corresponding to a rotating angle of the rotor.

A series of the three-phase currents supplied to the stator coils are varied in phase and amplitude by a controller. The rotating speed of the motor is controlled by adjusting the phase (frequency) of each phase current. The peak value of the rotating torque generated by supply of the phase currents to the stator coils is determined by a rating of the motor. The three-phase currents produce their respective component torques which act in combination to rotate the rotor.

It is known that such a brushless DC motor for driving a disk which tends to create a given rate of inertia in rotation encounters an unwanted load caused by e.g. frictional wear during a long period of service. Also, the starting torque of the motor declines with time. If the motor is designed to produce a minimum rotating torque which is a bit greater than the actually required driving force for starting rotation, it may fail to start rotating with high probability. When the rotating torque of the motor becomes too low, it has to be repaired or replaced with a new one.

SUMMARY OF THE INVENTION

It is a first object of the present invention to provide an improved method of driving a DC motor in which when the rotating torque of the motor becomes low due to increase in unwanted load or declination in capability, the motor can remain operable without troublesome repair or replacement.

It is a second object of the present invention to provide an improved circuit for driving a DC motor which is capable of carrying out the method of the first object.

The other objects and advantages of the present invention will be apparent from the following description.

DETAILED DESCRIPTION OF THE PREFERRED EMBODIMENTS

The present invention will be described in more detail referring to the accompanying drawings.

A first embodiment of the present invention will be explained in the form of a circuit and a method of driving a DC motor, referring to FIGS. 1 to 3.

Figure 1:
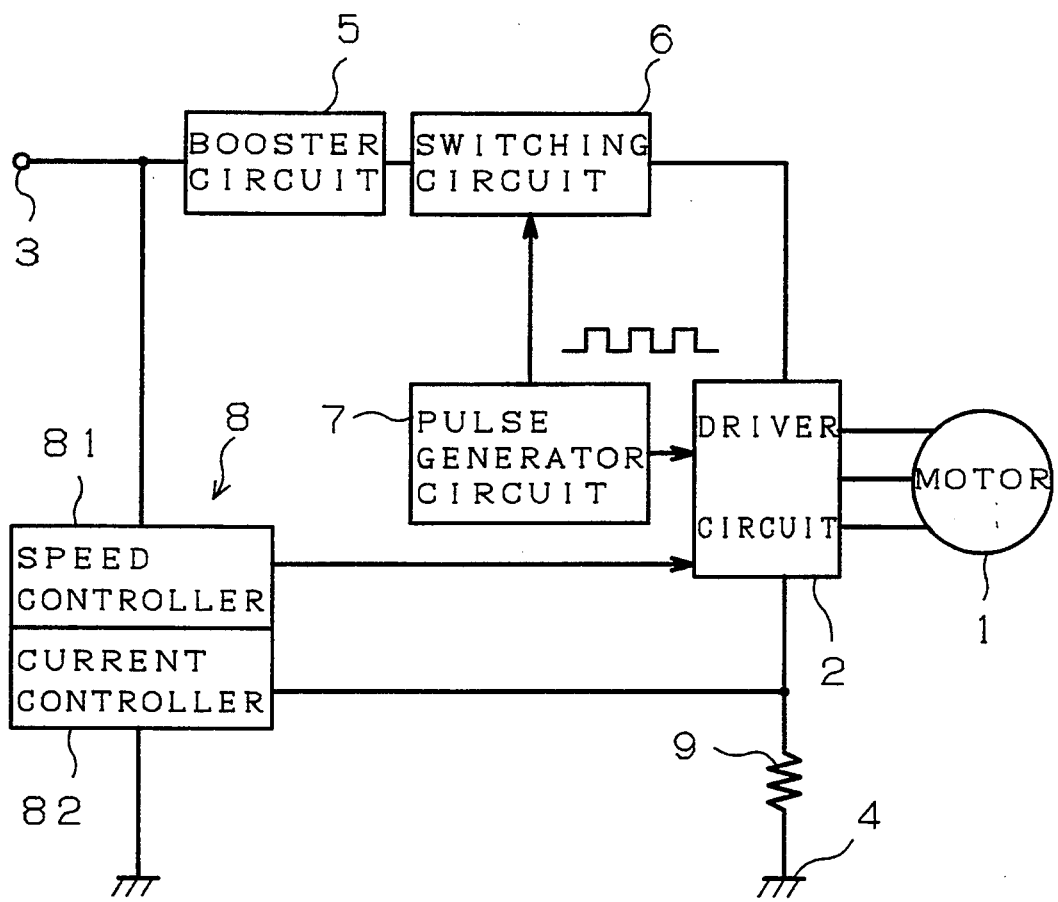
FIG. 1 is a block diagram of a DC motor driving circuit showing a first embodiment of the present invention.

FIG. 1 illustrates a circuitry arrangement for driving a DC motor. The motor 1 comprises a rotor having a permanent magnet and a stator having three-phase stator coils. The motor 1 is activated by a series of three-phase drive currents supplied from a driver circuit 2. The driver circuit 2 is connected between a power supply terminal 3 and a grounding terminal 4. More specifically, the power supply terminal 3 is coupled to the driver circuit 2 through a booster circuit 5 and a switching circuit 6 which are arranged in series. The booster circuit 5 is provided for amplifying an input voltage from the power supply terminal 3. The switching circuit 6 upon receiving a pulse signal of e.g. several tens of hertz from a pulse generator circuit 7 performs a switching action to convert the input voltage of the booster circuit 5 to a pulse-shaped signal.

The driver circuit 2 is controlled by a controller circuit 8 which comprises a speed controller 81 and a current controller 82. The speed controller 81 transmits a signal to the driver circuit 2 for controlling the phase (frequency) of each phase current in order to determine a rotating speed of the motor 1. The current controller 82 is connected to an intermediate point between the driver circuit 2 and a load 9 for controlling the amplitude of each phase current supplied from the driver circuit 2 to the motor 1.

Figure 2:
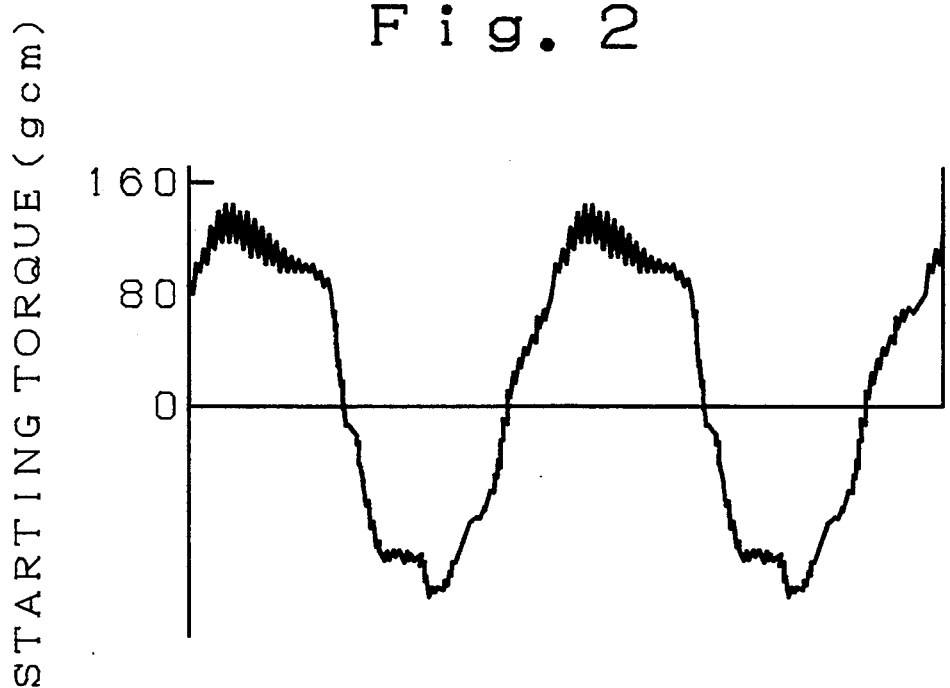
FIG. 2 is a waveform diagram of a torque produced by one phase portion of a motor with the use of the driving circuit shown in FIG. 1.
Figure 3:
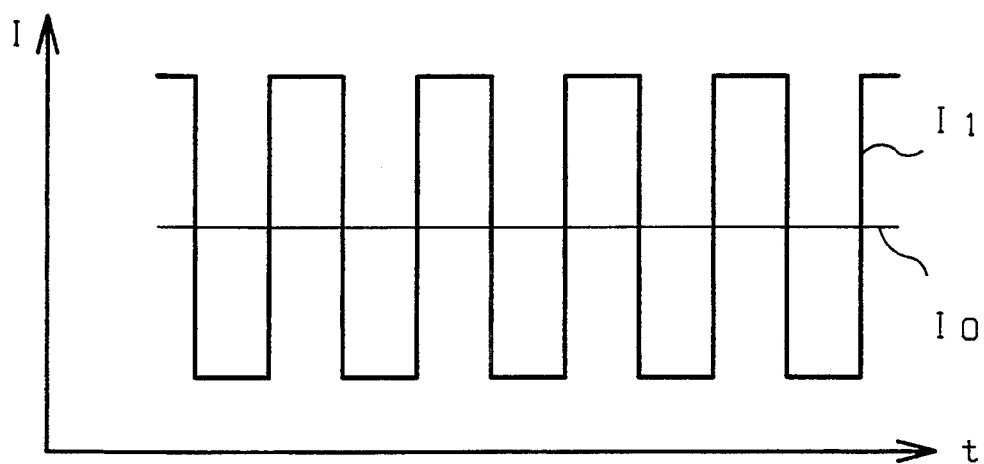
FIG. 3 is a waveform diagram of a uniform amplitude current to be supplied to the motor.

FIG. 2 shows the response of a torque generated by one phase of the stator coils of the motor 1 which rotates at two revolutions per minute. As the input voltage from the switching circuit 6 pulsates at a given repetition rate, each phase current of the driver circuit 2 fluctuates in amplitude. Accordingly, the torque generated in the motor 1 pulsates at several tens hertzs of pulse frequency, as shown in FIG. 2.

This will be explained in more detail referring to FIG. 3. FIG. 3 illustrates the waveform of an output current of the driver circuit 2 which is fed to the motor 1. The pulsating direct current I1 controlled by the switching circuit 6 rises and falls at a given pulse frequency. When the pulsating direct current $I_1$ is equal in average value to a basic direct current $I_0$, the effective current remains unchanged. Hence, the peak value of the phase currents of the driver circuit 2 fed to the motor 1 can be increased without changing the amplitude of an input DC power fed to the power supply terminal 3. When the phase current supplied to the motor 1 is increased to a peak momentarily, a resulting momentary torque becomes high.

In particular, a motor which fails to be activated by the basic current $I_0$ due to increase in the loading or declination in the capability, can successfully be started by the peak value of the pulsating direct current $I_1$. Once the motor 1 starts rotating, it can continue to rotate with a lower rotating torque. The motor 1 thus remains rotating even if the phase current momentarily drops to a lower level than the average value ($I_0$).

As understood, the foregoing arrangement of the first embodiment will provide the following advantages. As the input DC voltage to the driver circuit 2 is varied in amplitude at short intervals, a peak value of the phase currents of the driver circuit 2 stays high thus producing a higher torque for starting the motor 1. Hence, when undesired loads, e.g. frictions, resulting from wear during long-period service are increased, the motor 1 can still be started with no difficulty. More specifically, even if the basic direct current $I_0$ fails to start the motor 1, the pulsating direct current $I_1$ of which average value is equivalent to the amplitude of the current Io can rotate the motor 1. At the time, no increase in the input DC power fed to the power supply terminal 3 will be needed.

Figure 4:
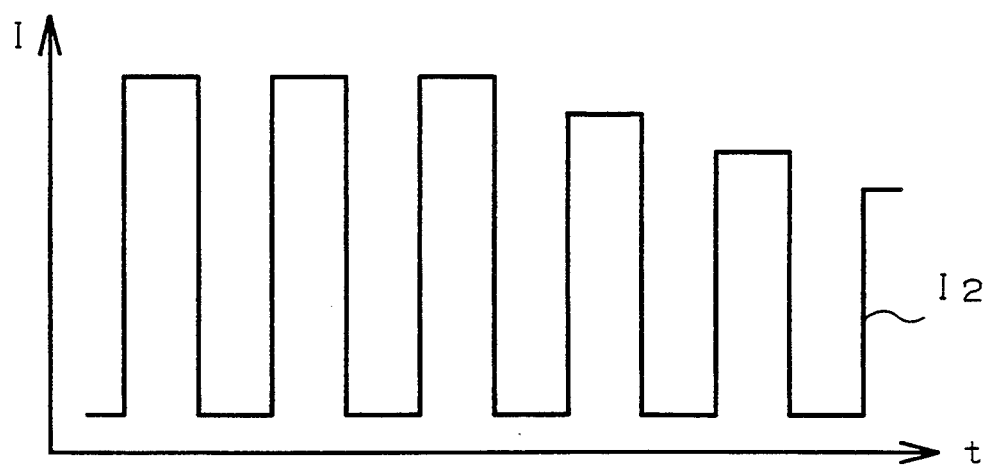
FIG. 4 is a waveform diagram of a decremental amplitude current to be supplied to the motor.

FIG. 4 shows the waveform of another pulsating direct current of the driver circuit 2 to be supplied to the motor 1. The pulsating direct current $I_2$ determined by the switching circuit 6 and fed to the driver circuit 2 gradually decreases in amplitude. The reason is that the motor 1 is started during an initial period when the required peak value of the current $I_2$ is high. Continuous rotation of motor 1 no longer requires such a high magnitude of torque as that required for starting the motor. Hence, when the amplitude of the current $I_2$ decreases to a level, the motor 1 can remain rotating with a low but appropriate magnitude of the torque.

Also, as the phase currents to the motor 1 have a waveform of pulse-like shape, the torque generated in the motor 1 exhibits periodic variation. The variation in the torque may cause a load to pulsate. For example, if the motor 1 is a spindle motor for rotating a hard disk, the variation in its torque will pulsate the hard disk thus attenuating the magnetic attraction between the hard disk and a magnetic head. As the magnetic attraction is reduced, the motor 1 or the hard disk will easily commence a rotating action.

The first embodiment of the present invention allows the driver circuit 2 for the motor 1 to receive a DC voltage of pulse-like waveform.

A second embodiment of the present invention will now be described in the form of a circuit for driving a DC motor, FIG. 5.

Figure 5:
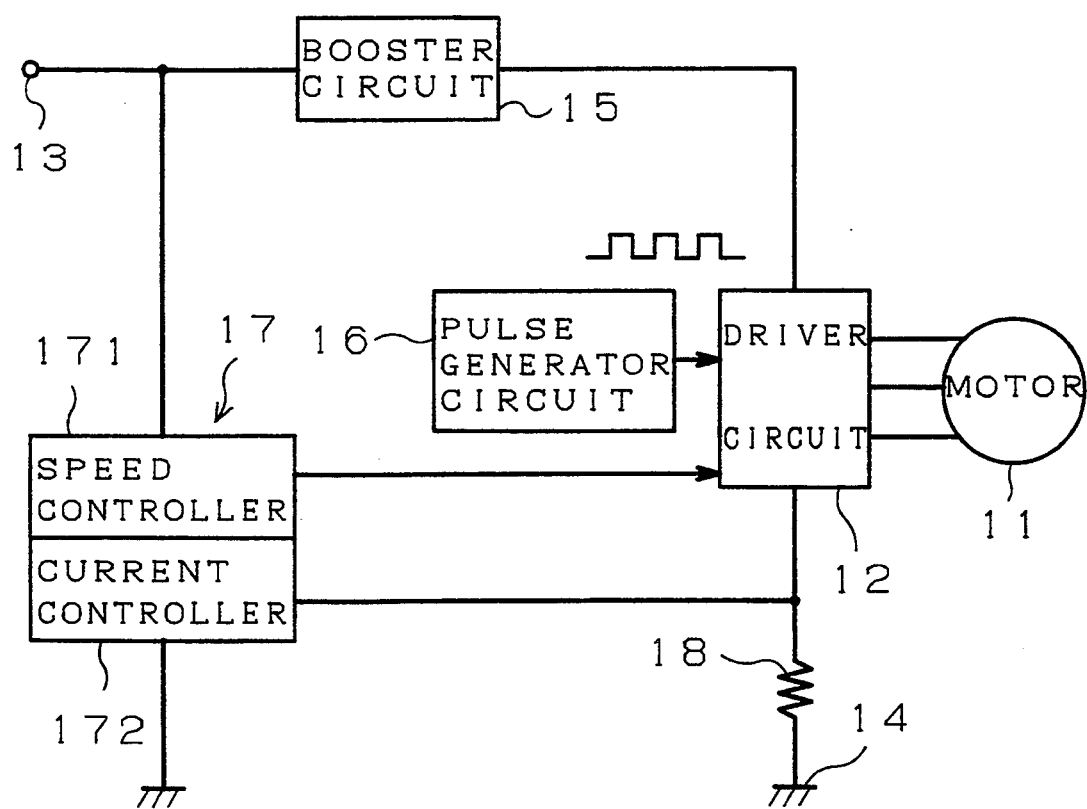
FIG. 5 is a block diagram of a DC motor driving circuit showing a second embodiment of the present invention.

As shown in FIG. 5, the DC motor 11 which comprises a rotor having a permanent magnet and a stator having three-phase stator coils is activated by a series of three-phase drive currents supplied from a driver circuit 12. The driver circuit 12 is arranged between a power supply terminal 13 and a grounding terminal 14. More particularly, the driver circuit 12 is coupled in series through a booster circuit 15 to the power supply terminal 13. Hence, an output of the booster circuit 15 is directly fed to the driver circuit 12. Also, a pulse generator circuit 16 is provided for supply of a pulse signal to the driver circuit 12. The driver circuit 12 is controlled by a controller circuit 17 which comprises a speed controller 171 and a current controller 172. The speed controller 171 is arranged for controlling the phase (frequency) of each phase current of the driver circuit 12 to be supplied to the motor 11. The current controller 172 which is connected to an intermediate point between the driver circuit 12 and a load 18, is arranged for controlling the amplitude of each phase current of the driver circuit 12 to the motor 11. In action, the driver circuit 12 converts an input DC current to phase outputs of pulse-like waveform to the motor 11 according to the pulse signal from the pulse generator circuit 16.

In the action of the second embodiment, the phase currents of the driver circuit 12 supplied to the motor 11 can be increased in peak value while remaining unchanged in average value. Hence, a resulting momentary torque for starting the motor 11 becomes high. As the momentary torque increases, the motor 11 can successfully be started when loaded with an excessive load that resists being driven by a common direct current of the average value.

As set forth above, the first and second embodiments allow the phase currents to be supplied to the motor 1 or 11 with their peak value being increased to a maximum for producing an optimum rotating torque while the average value remains unchanged.

It would be understood that the present invention is not limited to the two embodiments. So long as the rotating torque of the motor 1 or 11 is increased to a maximum, the average of the phase currents ought not to be equal to the amplitude of the basic direct current. For example, the average of an input direct current can remain low while a rotating torque is increased. The rotating torque is increased by increasing the momentary current resulting in the driving force of the motor becoming high.

If no deficiency in the torque required for starting the motor is involved with the supply of a common direct current in either of the first or second embodiment, it is unnecessary to pulsate the phase currents of the driver circuit 2 or 12. For example, the driver circuit 2 or 12 can be connected directly to the power supply terminal 3 or 13 in common operation. If the motor 1 or 11 fails to be started by normal starting currents, the booster circuit 5 or 15 can be connected between the power supply terminal 3 or 13 and the driver circuit 2 or 12.

The present invention is not limited to the circuit and the method of driving a DC motor described in the embodiments. Other changes and modifications will be possible without departing from the scope of the present invention.

I claim:

1. A circuit for driving a DC motor, comprising:
a booster circuit receiving an input voltage signal and generating an amplified output voltage signal;
a pulse generator circuit generating a pulse signal;
means coupled to the booster circuit and the pulse generator circuit for receiving the pulse signal from the pulse generator circuit and the amplified output voltage signal from the booster circuit and converting each phase of the amplified output voltage signal into a pulsed voltage signal; and
a driver circuit for transmitting the pulsed voltage signal to windings of the DC motor and generating a pulsating motor torque having a peak value which is sufficient to start the DC motor and an average value which would be insufficient for starting the DC motor in non-modulated form.

2. A circuit for driving a DC motor according to claim 1, wherein the DC motor is a brushless DC motor.

3. A circuit for driving a DC motor according to claim 1, wherein the DC motor comprises a rotor having a permanent magnet and a stator having three-phase stator coils.

4. A circuit for driving a DC motor according to claim 1, wherein said driver circuit is coupled to a power supply terminal through said booster circuit and a switching circuit arranged in series, and wherein said switching circuit is arranged for switching to shift the output voltage signal of said booster circuit to a pulsed form in response to the pulse signal from said pulse generator circuit.

5. A circuit for driving a DC motor according to claim 4, further comprising a selector circuit for selecting during a normal operation a first state in which said power supply terminal is directly connected to said driver circuit, and when the DC motor becomes unable to start, a second state in which said power supply terminal is connected to said booster circuit.

6. A circuit for driving a DC motor as defined in claim 1, wherein said driver circuit generates pulsating phase DC drive currents corresponding to said pulsed voltage signal with predetermined frequencies in each phase in response to the pulse signal from said pulse generator circuit.

7. A circuit for driving a DC motor according to claim 6, wherein each of said pulsating phase DC drive currents further includes the following components:
   an effective (average) non modulated current level (IO) which is not of sufficient magnitude to start the DC motor if said drive currents were applied to the DC motor in non modulated form; and
   a peak current level which is of sufficient magnitude to start the DC motor.

8. A circuit for driving a DC motor according to claim 6, wherein each of said drive currents further includes the following components:
   an effective (average) non modulated current level (IO) which is not of sufficient magnitude to start the DC motor if said drive currents were applied to the DC motor in non modulated form;
   a peak current level which is of sufficient magnitude to start the DC motor; and
   a minimum current value which does not drop to zero magnitude.

9. A circuit for driving a DC motor according to claim 7, wherein the peak current level changes over time.

10. A circuit for driving a DC motor according to claim 6, wherein said driver circuit is controlled by a controller circuit which comprises a speed controller for controlling the phase of each phase and a current controller for controlling the amplitude of the phase currents fed from said driver circuit to the motor.

11. A method of driving a DC motor comprising the steps of:
   transmitting an input voltage signal to a booster circuit and generating an amplified output voltage signal therefrom;
   generating a pulse signal with a pulse generator circuit;
   converting each phase of the amplified output voltage signal into a pulsed voltage signal based on the pulse signal from the pulse generator circuit; and
   transmitting the pulsed voltage signal with a driver circuit to windings of the DC motor and generating a pulsating motor torque having a peak value which is sufficient to start the DC motor and an average value which would be insufficient for starting the DC motor in non-modulated form.

12. A method of driving a DC motor according to claim 11, wherein said pulsed voltage signal supplied to the DC motor is pulsated only when the DC motor fails to start rotating upon supply of DC currents.

* * * * *

UNITED STATES PATENT AND TRADEMARK OFFICE
CERTIFICATE OF CORRECTION

PATENT NO. : 5,363,028
DATED : November 8, 1994
INVENTOR(S) : Mori

It is certified that error appears in the above-indentified patent and that said Letters Patent is hereby corrected as shown below:

On the Title Page, item [30], under "Foreign Application Priority Data", please delete "May 7, 1991 and substitute --June 7, 1991--.

Column 6, line 9, claim 10, after the second occurrence of "phase" insert --current--.

Signed and Sealed this

Twenty-eight Day of February, 1995

Attest:

BRUCE LEHMAN

*Attesting Officer*     *Commissioner of Patents and Trademarks*